United States Patent
Xu et al.

(10) Patent No.: US 10,637,287 B2
(45) Date of Patent: Apr. 28, 2020

(54) APPARATUS AND METHOD FOR ENSURING RELIABILITY OF TRIP PROTECTION OF INTELLIGENT SUBSTATION

(71) Applicants: NR ELECTRIC CO., LTD, Jiangsu (CN); NR ENGINEERING CO., LTD, Jiangsu (CN)

(72) Inventors: Zongguang Xu, Jiangsu (CN); Jifeng Wen, Jiangsu (CN); Yong Chen, Jiangsu (CN); Xiang Li, Jiangsu (CN); Yan Li, Jiangsu (CN); Yucan Zhao, Jiangsu (CN); Ming Yuan, Jiangsu (CN); Qiang Zhou, Jiangsu (CN); Guanghua Li, Jiangsu (CN); Tianen Zhao, Jiangsu (CN); Dewen Li, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 49 days.

(21) Appl. No.: 16/062,635

(22) PCT Filed: Apr. 14, 2016

(86) PCT No.: PCT/CN2016/079222
§ 371 (c)(1),
(2) Date: Jun. 15, 2018

(87) PCT Pub. No.: WO2017/101238
PCT Pub. Date: Jun. 22, 2017

(65) Prior Publication Data
US 2019/0190315 A1    Jun. 20, 2019

(30) Foreign Application Priority Data

Dec. 16, 2015 (CN) .......................... 2015 1 0945548

(51) Int. Cl.
*G06F 11/00* (2006.01)
*H02J 13/00* (2006.01)
(Continued)

(52) U.S. Cl.
CPC ........ *H02J 13/0062* (2013.01); *G06F 9/3877* (2013.01); *G06F 11/1004* (2013.01); *H04L 1/22* (2013.01)

(58) Field of Classification Search
None
See application file for complete search history.

(56) References Cited

U.S. PATENT DOCUMENTS

| | | | | |
|---|---|---|---|---|
| 2008/0170508 | A1* | 7/2008 | Popiak | H04L 1/24 370/252 |
| 2011/0029687 | A1* | 2/2011 | Kirrmann | H04L 12/437 709/236 |

(Continued)

FOREIGN PATENT DOCUMENTS

| | | |
|---|---|---|
| CN | 102025126 | 4/2011 |
| CN | 201956676 | 8/2011 |

(Continued)

OTHER PUBLICATIONS

Hu Xuan, Li Bing and Huo Lijie, "Fault-tolerant control system research based on dual CPU redundancy for high-voltage inverter," CICED 2010 Proceedings, Nanjing, 2010, pp. 1-3. (Year: 2010).*

(Continued)

*Primary Examiner* — Daniel F. McMahon
(74) *Attorney, Agent, or Firm* — JCIPRNET

(57) ABSTRACT

An apparatus and method for ensuring the reliability of a trip protection of an intelligent substation. The apparatus comprises a main CPU and an auxiliary CPU connected together, and a main FPGA and an auxiliary FPGA connected together. The main FPGA and the auxiliary FPGA are (Continued)

connected to a physical layer of a protection apparatus, and the main CPU and the auxiliary CPU are connected to a state monitoring data output end of a protected device. The main CPU sends a processing result to the main FPGA, the auxiliary CPU sends the processing result to the auxiliary FPGA, and the auxiliary FPGA synchronizes current information with the main FPGA after receiving information sent by the auxiliary CPU. When the main FPGA receives trip information, the main FPGA comparing the consistency of current trip information obtained from the main CPU with current trip information obtained from the auxiliary FPGA.

6 Claims, 1 Drawing Sheet

(51) Int. Cl.
*H04L 1/22* (2006.01)
*G06F 11/10* (2006.01)
*G06F 9/38* (2018.01)

(56) References Cited

U.S. PATENT DOCUMENTS

2013/0142336 A1* 6/2013 Fries .................... H04L 9/0825
                                                        380/278
2014/0293494 A1* 10/2014 Allen ...................... H02H 7/20
                                                        361/93.1
2017/0070336 A1* 3/2017 Chen ...................... H02H 7/261

FOREIGN PATENT DOCUMENTS

| CN | 102522821 | 6/2012 |
| CN | 203660659 | 6/2014 |
| CN | 104184120 | 12/2014 |
| CN | 204088194 | 1/2015 |
| CN | 105429094 | 3/2016 |
| JP | 5802438 | 10/2015 |
| KR | 20010077755 | 8/2001 |

OTHER PUBLICATIONS

"International Search Report (Form PCT/ISA/210)", dated Jul. 26, 2016, with English translation thereof, pp. 1-6.

* cited by examiner

APPARATUS AND METHOD FOR ENSURING RELIABILITY OF TRIP PROTECTION OF INTELLIGENT SUBSTATION

CROSS-REFERENCE TO RELATED APPLICATION

This application is a 371 application of the international PCT application serial no. PCT/CN2016/079222, filed on Apr. 14, 2016, which claims the priority benefit of China application no. 201510945548.8, filed on Dec. 16, 2015. The entirety of each of the abovementioned patent applications is hereby incorporated by reference herein and made a part of this specification.

BACKGROUND

Technical Field

The present invention relates to an apparatus and method for ensuring the reliability of a protection trip of an intelligent substation.

Description of Related Art

A digital substation is a current development direction of a substation automation system. Especially, as the International Standard for Substation Communication Networks and Systems (IEC61850) is issued, a standard specification is provided for the construction of digital substations, and the development of digital substation application and construction is greatly promoted. In the digital substations, the Ethernet is the principal communication medium. The communication network is used to replace a secondary cable, so that an alternating current module and a control module of a conventional protection and monitoring apparatus can be canceled, and all information is transmitted via a process-layer network. Thus, the costs of the purchase of secondary cables and cable laying for the substation are reduced, and the workload of secondary wiring for the conventional substations is also greatly alleviated.

In the conventional substations, anti-misoperation of a trip unit of a relay protection apparatus is implemented based on starting and protection logics. Enablement conditions and operation conditions of the apparatus are different. It is easier to meet the enablement conditions. For example, voltage fluctuation and current fluctuation may both cause enablement of protection, and in this case, the apparatus will not trip the breaker. However, the conditions of the protection operations are stricter. In the case where a protected device has a fault, only after the apparatus is enabled first and meets logical conditions of protection operations, the apparatus makes an operation and is exited to trip the breaker. For the conventional relay protection apparatus, by turning off a relay circuit, it is ensured that the apparatus that is not enabled cannot operate the breaker through any actions.

In intelligent digital substations, transmission of a switching value and a trip signal is implemented by a Goose service in the standard IEC61850, which is a network data communication manner substituted for hardwiring between conventional intelligent electronic devices. A monitoring and protection apparatus sends a switching command to an intelligent operation box via Goose, and the intelligent operation box executes connection/disconnection of the switch according to the received command. Protection and enablement logics still exist in the protection apparatus of the digital substation. However, the protection apparatus sends out a trip packet in an Ethernet packet manner after finally meeting software logics.

With the increasing demands for intelligence, informatization, and digitization, the protection apparatus of the digital substation uses a large number of integrated circuit devices, which are used to achieve core functions of the system. However, as a hardware platform becomes increasingly complex and its scale is getting larger, usage of the integrated devices increases accordingly. Therefore, the protection apparatus has an increasing risk of operation abnormity due to failures of some hardware. A failure in common hardware on a data processing link easily causes misoperation of the protection apparatus.

At the same time, with the rapid development of techniques, innovations further improve device performance in the rate, capacity, and power consumption. However, technical development also makes some of the previously negligible effects prominent. For example, single event upset (SEU) results in an increasing impact of a soft error. Although the soft error rate per bit has been reduced in the device by means of rigorous IC design, but a logical capacity of each process node is continuously doubled and bits of an on-chip Static Random Access Memory (SRAM) also increase in number accordingly. Because a large number of SRAM-based processors, memories, and field programmable gate arrays (FPGAs) are used in the protection apparatus, the risk of soft error caused by the single event upset (SEU) become prominent. It is rather difficult to monitor such abnormity, and it can only be found when an inaccurate operation occurs in protection.

SUMMARY OF THE INVENTION

To solve the foregoing problems, the present invention provides an apparatus and method for ensuring the reliability of a protection trip of an intelligent substation, where by using an architecture of setting double FPGAs and double central processing units (CPUs), and by means of a data link redundancy check, an anti-misoperation ability of a protection apparatus is improved, and it is ensured that the apparatus cannot cause a misoperation of a primary device due to an unknown error when a hardware device failure, SEU, etc. happens.

To achieve the foregoing technical objectives and effects, the present invention is implemented through the following technical solutions:

An apparatus for ensuring the reliability of a protection trip of an intelligent substation, characterized in that, including a main CPU and an auxiliary CPU connected together, and a main FPGA and an auxiliary FPGA connected together, where the main FPGA and the auxiliary FPGA are both connected to a physical layer of a protection apparatus, and the main CPU and the auxiliary CPU are both connected to a state monitoring data output end of a protected device:

wherein, the main CPU sends a processing result to the main FPGA, the auxiliary CPU sends a processing result to the auxiliary FPGA, and after receiving the information sent by the auxiliary CPU, the auxiliary FPGA synchronizes the information with the main FPGA;

When the main FPGA receives trip information, the main FPGA makes a consistency comparison between the trip information obtained from the main CPU and that obtained from the auxiliary FPGA, and if the two are consistent, the main FPGA sends the information received from the main CPU to the protection apparatus, otherwise, discards the information received from the main CPU.

A method for ensuring the reliability of a protection trip of an intelligent substation, characterized in that, specifically comprising the following steps:

Step 1: a main CPU and an auxiliary CPU, respectively, collecting state monitoring data of a protected device, determining a protection logic according to a sampling value, and sending results of a protection operation to corresponding FPGAs respectively, where the main CPU sends a trip packet to a main FPGA, calculates a cyclic redundancy check (CRC) corresponding to the collected data and sends the CRC to the main FPGA; and the auxiliary CPU sends a trip state to an auxiliary FPGA; and Step 2: pre-processing, by the main FPGA and the auxiliary FPGA, received data, where the auxiliary FPGA synchronizes current information with the main FPGA; and parsing, by the main FPGA, information received from the main CPU, where if the information does not include trip information, the main FPGA directly attaches the CRC to the end of the information received from the main CPU and then sends it to a physical layer of a protection apparatus; or if the information includes the trip information, the main FPGA makes a consistency comparison between the trip information obtained from the main CPU and that obtained from the auxiliary FPGA, and if the two are consistent, the main FPGA directly attaches the CRC to the end of the information received from the main CPU and then sends it to a physical layer of a protection apparatus, otherwise, discards the information received from the main CPU.

Beneficial effects of the present invention are as follows:

First, if a hardware device fails, any processing unit obtaining a wrong trip result will finally lead to double FPGAs detecting inconsistent trip startup information. As such, export of a trip packet is forbidden, thus controlling an impact of abnormity within the apparatus.

Secondly, if a correct trip result is obtained. However, during packet transmission, packet content is changed due to physical signal interference, SEU, or other problems, resulting in inconsistency between the CRC and the packet content. Then, the receiver will discard the packet, and incorrect tripping may not be caused.

Thirdly, after the present invention is applied in a protection device of a digital substation, the anti-misoperation ability of the device can be dramatically enhanced, and stability and reliability of the system can be improved.

DETAILED DESCRIPTION OF THE EMBODIMENTS

The technical solutions of the present invention are further described in detail below with reference to the accompanying drawings and specific embodiments, so that persons skilled in the art can better understand the present invention and implement the present invention. However, the given embodiments are not intended to limit the present invention.

Figure 1:
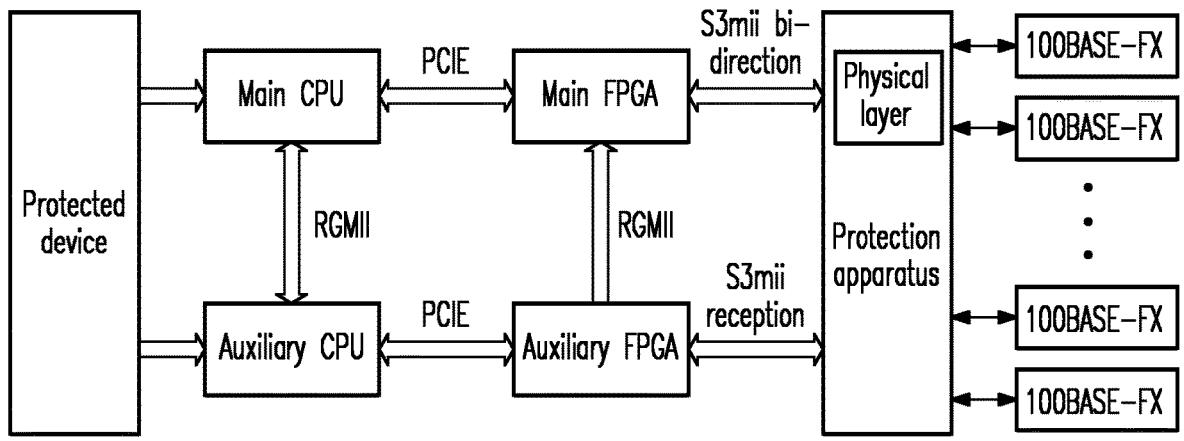
FIG. 1 is a structural block diagram of an apparatus for ensuring the reliability of a protection trip of an intelligent substation according to the present invention.

An apparatus for ensuring the reliability of a protection trip of an intelligent substation is provided. As shown in FIG. 1, the apparatus includes a main CPU and an auxiliary CPU connected together, and a main FPGA and an auxiliary FPGA connected together. The main FPGA and the auxiliary FPGA are both connected to a physical layer (PHY) of a protection apparatus, and the main CPU and the auxiliary CPU are both connected to a state monitoring data output end of a protected device. A redundant architecture of setting double CPUs and double FPGAs is used as a hardware architecture. The FPGAs serve as auxiliary processors for processing a network packet, and the double CPUs receive the same measurement data as a basis for judging a protection logic.

The apparatus, as a protection apparatus for supporting the protocol IEC61850, monitors a measurement state of the protected device, including information such as a switching value, voltage, current, and phase. Upon detecting a failure in the protected device, the apparatus sends a Goose packet through a GOOSE service, to give a trip command to an intelligent operation box, so that a connection between the protected device and a primary system is cut off.

The main CPU sends a processing result to the main FPGA, the auxiliary CPU sends a processing result to the auxiliary FPGA, and after receiving the information sent by the auxiliary CPU, the auxiliary FPGA synchronizes the information with the main FPGA.

When the main FPGA receives trip information, the main FPGA makes a consistency comparison between the trip information obtained from the main CPU and that obtained from the auxiliary FPGA, and if the two are consistent, the main FPGA sends the information received from the main CPU to the protection apparatus, otherwise, discards the information received from the main CPU.

Preferably, one-way communication is conducted between the main FPGA and the auxiliary FPGA, and the auxiliary FPGA periodically sends a message to the main FPGA in frames. The communication between the main FPGA and the auxiliary FPGA is conducted generally through a high-speed communication interface, and the message is periodically sent in frames. A physical interface thereof may be an interface of any standard, such as a media independence interface (MII), enhanced parallel peripheral interface (EPPI), serial peripheral interface (SPI), peripheral component interface express (PCIE), or reduced gigabit media independent interface (RGMII). For example, the message is sent through the RGMII, a data bandwidth is 1 Gbps, and all data is completely sent within 1 μs.

Bidirectional communication is conducted between the main FPGA and a physical-layer chip of the protection apparatus through, for example, an S3MII bidirectional communication interface. One-way communication is conducted between the auxiliary FPGA and the physical-layer chip of the protection apparatus through, for example, an S3MII communication interface. The auxiliary FPGA receives a message sent by the physical layer of the protection apparatus.

In an existing design, a cyclic redundancy check (CRC) of an Ethernet packet link layer, as a standard check mode for Ethernet data, is usually calculated by an FPGA used for network information processing. During sending and exportation, the CRC is attached to the end of a valid packet and sent out. Upon detecting inconsistency between packet content and the CRC, a receiving side discards the data on a data link layer, and does not parse and execute the wrong packet content. However, in the present invention, the CRC is calculated by the main CPU and is then sent out by the FPGA. Specifically, while sending a packet to the main FPGA, the main CPU also sends a CRC corresponding to the packet. During sending of an Ethernet packet, the main FPGA directly attaches the CRC to the end of a frame and sends it out, and does not calculate a CRC by itself; and the main FPGA does not change any packet content. In this way, the main FPGA is only responsible for determining sending or not, but cannot change any packet content. If the packet content is changed due to any processing or abnormity in this period, the receiving side cannot receive a correct packet, thus ensuring no misoperation of the protection apparatus and effectively guaranteeing data integrity.

Generally, only a small quantity of packets sent by the apparatus are trip packets. After receiving a packet sent by the main CPU, the main FPGA can determine, by parsing the packet format, the type of the to-be-sent packet and whether it is required to check the consistency. If not including trip information (that is, the packet is an ordinary packet), the packet is directly sent out without performing the consistency comparison. However, for trip packet, it is required to make a comparison between a trip packet and a link trip information list obtained after synchronization with the auxiliary FPGA. Only when the current link is allowed to be tripped according to data of the double FPGAs, the packet in the current frame can be sent out through Ethernet, otherwise, data in the current frame is discarded.

The format of the trip information is supported by a multi-LD (Laser disc) device. Sixteen different trip enablement signal states are supported in this embodiment. In consideration of anti-misoperation, a frame header, frame tail, and check are added, and specific values of trip enablement signals are coded, where the coding values are ensured to be as irregular as possible, thus avoiding misjudgment after 1-bit misalignment and overall shift.

Figure 2:
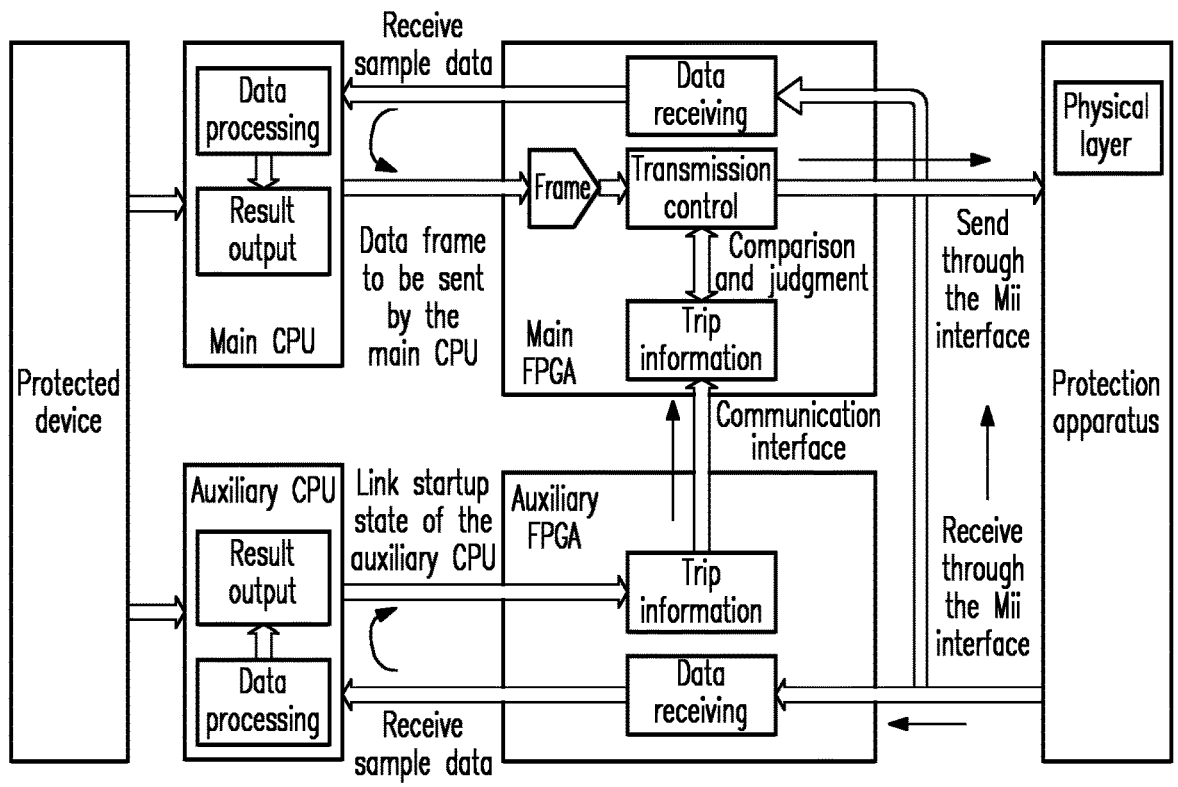
FIG. 2 is an information flowchart of a method for ensuring the reliability of a protection trip of an intelligent substation according to the present invention.

Accordingly, as shown in FIG. 2, a method for ensuring the reliability of a protection trip of an intelligent substation specifically includes the following steps:

Step 1: A main CPU and an auxiliary CPU separately collect state monitoring data of a protected device, determine a protection logic according to a sampling value, and send results of a protection operation to corresponding FPGAs respectively, where the main CPU sends a trip packet to a main FPGA, calculates a CRC corresponding to the collected data and sends the CRC to the main FPGA; and the auxiliary CPU sends a trip state to an auxiliary FPGA.

Step 2: The main FPGA and the auxiliary FPGA preprocess received data, where the auxiliary FPGA synchronizes current information with the main FPGA; and the main FPGA parses information received from the main CPU, where if the information does not include trip information, the main FPGA directly attaches the CRC to the end of the information received from the main CPU and then sends it to a physical layer of a protection apparatus; or if the information includes the trip information, the main FPGA makes a consistency comparison between the trip information obtained from the main CPU and that obtained from the auxiliary FPGA, and if the two are consistent, the main FPGA directly attaches the CRC to the end of the information received from the main CPU and then sends it to a physical layer of a protection apparatus, otherwise, discards the information received from the main CPU.

Beneficial effects of the present invention are as follows:

First, if a hardware device fails, any processing unit obtaining a wrong trip result will finally lead to the double FPGAs detecting inconsistent trip enablement information. As such, exportation of a trip packet is forbidden, thus controlling an impact of abnormity within the apparatus.

Secondly, if a correct trip result is obtained. However, during packet transmission, packet content is changed due to physical signal interference, SEU, or other problems, resulting in inconsistency between the CRC and the packet content. Then, a receiving party discards the packet, and incorrect tripping may not be caused.

Thirdly, after the present invention is applied in a protection device of a digital substation, the anti-misoperation ability of the device can be dramatically enhanced, and stability and reliability of the system can be improved.

The above merely describes preferred embodiments of the present invention, but is not intended to limit the scope of the present invention. Any equivalent structures or process transformations using the description of the present invention and the accompanying drawings may be applied directly or indirectly in other related technical fields, and all fall within the patent protection scope of the present invention.

What is claimed is:

1. An apparatus for ensuring the reliability of a trip protection of an intelligent substation, comprising a main central processing unit (CPU) and an auxiliary CPU connected together, and a main field programmable gate array (FPGA) and an auxiliary FPGA connected together, the main FPGA and the auxiliary FPGA are both connected to a physical layer of a protection apparatus, and the main CPU and the auxiliary CPU are both connected to a state monitoring data output end of a protected device:

wherein, the main CPU sends a processing result to the main FPGA, the auxiliary CPU sends a processing result to the auxiliary FPGA, and after receiving information sent by the auxiliary CPU, the auxiliary FPGA synchronizes the information with the main FPGA; and when the main FPGA receives trip information, the main FPGA makes a consistency comparison between trip information obtained from the main CPU and trip information obtained from the auxiliary FPGA, and if the trip information obtained from the main CPU and the trip information obtained from the auxiliary FPGA are consistent, the main FPGA sends the information received from the main CPU to the protection apparatus, otherwise, discards the information received from the main CPU.

2. The apparatus for ensuring the reliability of a trip protection of an intelligent substation according to claim 1, wherein a one-way communication is conducted between the main FPGA and the auxiliary FPGA, in which the auxiliary FPGA periodically sends a message to the main FPGA a frame.

3. The apparatus for ensuring the reliability of a trip protection of an intelligent substation according to claim 2, wherein a bidirectional communication is conducted between the main FPGA and a physical-layer chip of the protection apparatus, a one-way communication is conducted between the auxiliary FPGA and the physical-layer chip of the protection apparatus, and the auxiliary FPGA receives a message sent by a physical layer of the protection apparatus.

4. The apparatus for ensuring the reliability of a trip protection of an intelligent substation according to claim 1, wherein while sending a packet to the main FPGA, the main CPU also sends a cyclic redundancy check (CRC) corresponding to the packet; during sending of an Ethernet packet, the main FPGA directly attaches the CRC to the end of a frame and sends out the Ethernet packet, and does not calculate a CRC; and the main FPGA does not change any packet content.

5. The apparatus for ensuring the reliability of a trip protection of an intelligent substation according to claim 4, wherein after receiving a packet sent by the main CPU, the main FPGA parses the format of the packet to determine whether the packet comprises the trip information; and if the packet does not comprise the trip information, the packet is directly sent out without performing the consistency comparison.

6. A method for ensuring the reliability of a trip protection of an intelligent substation, specifically comprising the following steps:

Step 1: a main central processing unit (CPU) and an auxiliary CPU, respectively, collecting state monitoring data of a protected device, determining a protection logic according to a sampling value, and sending results of a protection operation to corresponding field programmable gate arrays (FPGAs) respectively, wherein the main CPU sends a trip packet to a main FPGA, calculates a cyclic redundancy check (CRC) corresponding to the collected state monitoring data and sends the CRC to the main FPGA; and the auxiliary CPU sends a trip state to an auxiliary FPGA; and Step 2: the main FPGA and the auxiliary FPGA preprocessing received data, wherein the auxiliary FPGA synchronizes information with the main FPGA; and the main FPGA parses the information received from the main CPU, wherein if the information does not comprise trip information, the main FPGA directly attaches the CRC to the end of the information received from the main CPU and then sends the information to a physical layer of a protection apparatus; if the information comprises the trip information, the main FPGA makes a consistency comparison between trip information obtained from the main CPU and trip information obtained from the auxiliary FPGA, and if the trip information obtained from the main CPU and the trip information obtained from the auxiliary FPGA are consistent, the main FPGA directly attaches the CRC to the end of the information received from the main CPU and then sends the information to a physical layer of a protection apparatus, otherwise, discards the information received from the main CPU.

* * * * *